United States Patent [19]

Yada

[11] Patent Number: 5,348,364
[45] Date of Patent: Sep. 20, 1994

[54] STRIP-SHAPED FASTENER FOR MOUNTING STRIP-SHAPED MEMBER TO AUTOMOBILE BODY AND DEVICE FOR MANUFACTURING THE SAME

[75] Inventor: Yukihiko Yada, Nagoya, Japan

[73] Assignee: Tokai Kogyo Kabushiki Kaisha, Ohbu, Japan

[21] Appl. No.: 75,018

[22] Filed: Jun. 11, 1993

Related U.S. Application Data

[63] Continuation of Ser. No. 753,232, Aug. 30, 1991, abandoned.

[30] Foreign Application Priority Data

Aug. 31, 1990 [JP] Japan .................... 2-231435

[51] Int. Cl.$^5$ .................................. B60J 10/02
[52] U.S. Cl. ................. 296/93; 296/146.15; 296/208
[58] Field of Search ............ 296/201, 208, 93, 146.15; 52/397, 400, 402, 403, 716.1, 716.5, 716.7, 716.6

[56] References Cited

U.S. PATENT DOCUMENTS

| | | | |
|---|---|---|---|
| 2,698,072 | 12/1954 | Beck | 52/716.5 |
| 2,736,404 | 2/1956 | Clingman | 296/93 X |
| 2,814,525 | 11/1957 | Thomas | 296/146.15 X |
| 4,757,659 | 7/1988 | Miyakawa et al. | |
| 4,757,660 | 7/1988 | Miyakawa et al. | |
| 4,858,988 | 8/1989 | Morgan et al. | 296/93 X |

FOREIGN PATENT DOCUMENTS

| | | | |
|---|---|---|---|
| 0249560 | 12/1987 | European Pat. Off. | 296/93 |
| 2161927 | 6/1973 | Fed. Rep. of Germany | 296/146.15 |
| 3300510 | 8/1983 | Fed. Rep. of Germany | 296/146.15 |
| 3223155 | 12/1983 | Fed. Rep. of Germany | 296/146.15 |
| 0112720 | 5/1991 | Japan | 296/93 |

*Primary Examiner*—Dennis H. Pedder
*Attorney, Agent, or Firm*—Oblon, Spivak, McClelland, Maier & Neustadt

[57] ABSTRACT

A fastener is used for coupling an article to a body panel of a motor vehicle via a strip-like member. The fastener includes a pair of extruded side fastener parts and an extruded upper fastener part integral with and extending between the side fastener parts. Each of the side and upper fastener parts includes a groove for receiving the article to be coupled to the body panel, and a groove for receiving the strip-like member. The position of the latter groove with respect to the former groove is changed depending upon how the strip-like member fits in a window opening of the vehicle body panel.

9 Claims, 6 Drawing Sheets

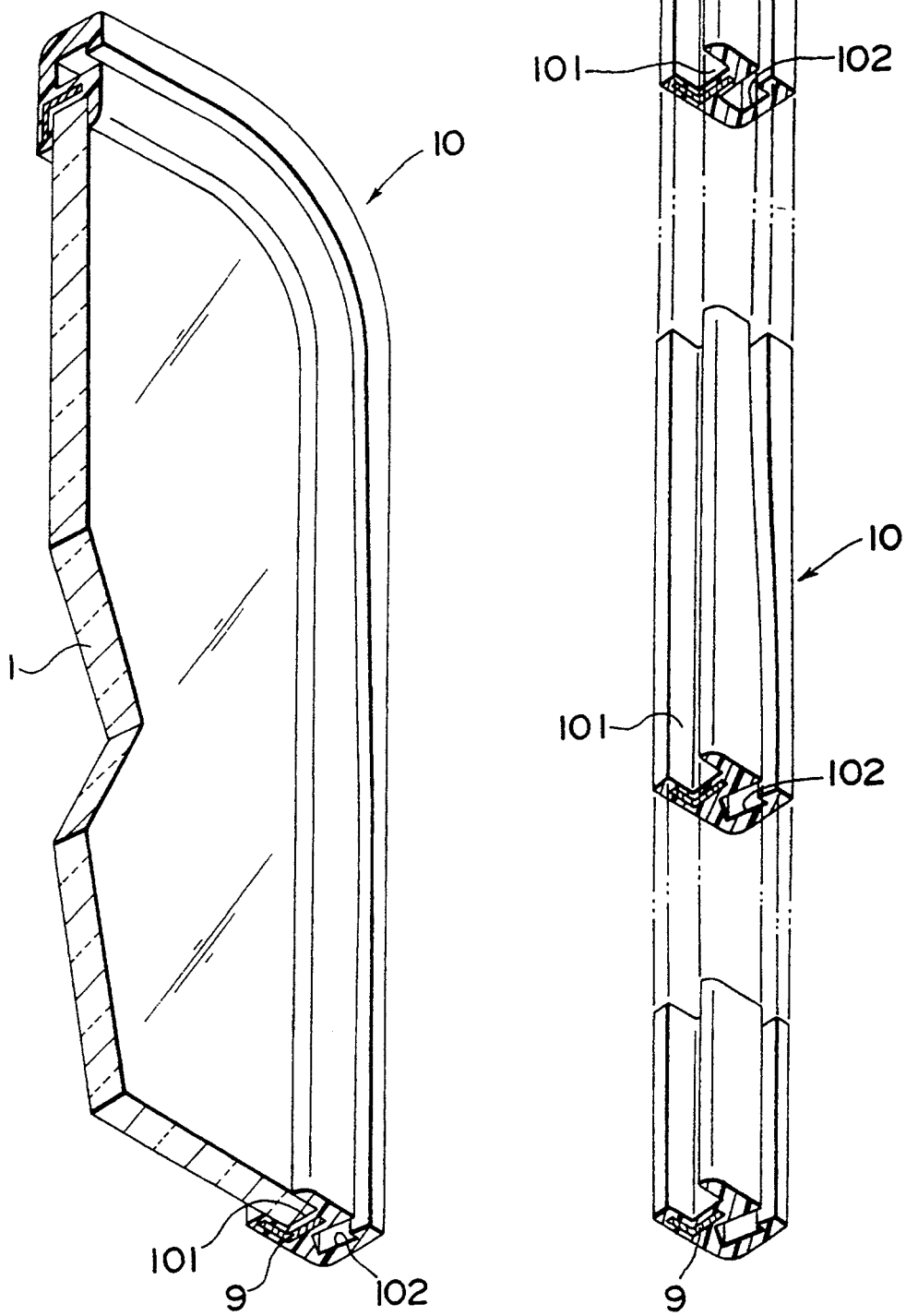

STRIP-SHAPED FASTENER FOR MOUNTING STRIP-SHAPED MEMBER TO AUTOMOBILE BODY AND DEVICE FOR MANUFACTURING THE SAME

This application is a Continuation of application Ser. No. 07/753,232, filed on Aug. 30, 1991, now abandoned.

BACKGROUND OF THE INVENTION

1. Field of the Invention

This invention relates to a fastener for mounting a strip-like member such as a windshield molding to a body panel of a motor vehicle, and to a device for manufacturing such fastener.

2. Discussion of the Background

Usually, a number of extruded strip-like members such as windshield moldings are installed in a motor vehicle. To attach such strip-like member (hereinafter called a "windshield molding"), firstly a fastener which is also a strip-like member is attached to a vehicle body panel, and secondly the windshield molding is coupled to the fastener, so that the windshield molding is attached to the vehicle body via the fastener.

Japanese Patent Laid-Open Publication No. 27723/1986 exemplifies one of such fasteners. This fastener is a strip-like member having a U-shaped groove. The fastener is firstly attached to a bent portion of a vehicle body panel by a positioning piece extending from the U-shaped groove. Secondly, a side wall of the U-shaped groove is fastened to the vehicle body panel. Then, a leg portion of a windshield molding is inserted into the U-shaped groove of the fastener. The windshield molding can be reliably attached to the vehicle body panel via such fastener even if the windshield molding has variations in its manufacturing precision.

Since this type of fastener is usually molded by an extrusion process, it has a uniform cross-sectional shape through its whole length, thereby keeping the U-shaped groove and the positioning piece relatively and uniformly aligned through the whole length of the fastener. Therefore, if the positional relation between the vehicle body panel and the windshield molding is changed depending upon the position where the windshield molding is attached to the body panel, fasteners having different shapes should be connected by a joint member.

For instance, the windshield molding is in tight contact with the upper edge of the windshield while the molding is attached somewhat apart from the side edges of the windshield. The spaces defined between the molding and the side peripheral surface of the windshield serve as water drain channels to guide rain water in a predetermined direction.

In such case, a fastener portion associated with the upper edge and fastener portions associated with the side edges of the windshield should have different cross-sectional shapes, being coupled via separate members such as joint members.

However, when the fasteners are coupled by the joint members, there would be a difference in height between them, causing accumulation of dust at the joint portions or causing the windshield molding to be pulled or lifted. Such pulled or lifted molding might be damaged when the motor vehicle is washed, for example. Noises would be caused by vibrations at the joint portions. Further, the external appearance of the motor vehicle might be hurt.

SUMMARY OF THE INVENTION

With a view to overcome the foregoing inconveniences, it is therefore an object of this invention to provide a fastener which is sequentially produced by extrusion process and can couple a strip-like member to a vehicle body panel without using joint members, and to provide a molding device for producing such fastener.

According to a first aspect of this invention, there is provided a strip-shaped fastener for coupling an article having a long side to a body panel of a motor vehicle via a strip-shaped member, including: a first long hollow portion for receiving the article having a long side; and a second long hollow portion for receiving the strip-shaped member, a position of the second long hollow portion with respect to said body panel being changed depending upon how the strip-shaped member fits in a window opening of the body panel of the motor vehicle.

According to a second aspect of this invention, there is provided a strip-shaped fastener for coupling an article having a long side to a body panel of a motor vehicle via a strip-shaped member, including: a first long hollow portion for receiving the article having a long side; and a second long hollow portion for receiving the strip-like member, the position of the second long hollow portion with regard to the body panel being changed with reference to a part thereof having constant position.

Further, there is provided a molding device for producing a fastener for coupling an article having a long side to a body panel of a motor vehicle via a strip-like member, the molding device comprising: a first die adapted to extrude material in the shape of a fastener having a hollow portion for receiving the article to be coupled to a body panel of a motor vehicle; and a second die adapted to form a hollow portion on the fastener to receive the strip-like member, the second die being positioned in front of the first die and being relatively movable to and from the first die.

With this arrangement, the second die is angularly movable to and from the first die.

In addition, the second die is movable in parallel with the first die.

According to this invention, the fastener is extruded as a strip having a varying cross-sectional shape. The fastener is very convenient for installing an article such as windshield molding in a space between a window opening of a motor vehicle and a windshield without using joint members, thereby assuring a good external appearance of the windshield molding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an external view of the fastener;

FIG. 5 shows the manner in which the fastener is attached along a peripheral edge of a windshield;

DESCRIPTION OF THE PREFERRED EMBODIMENTS

Figure 6:
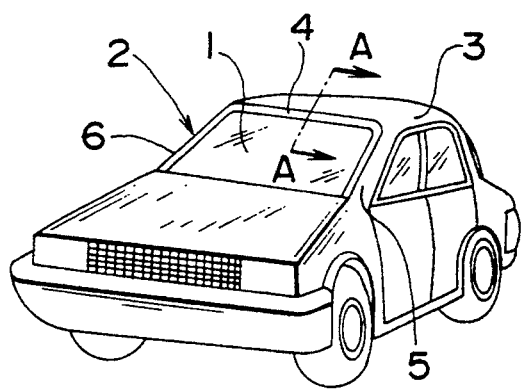
FIG. 6 is a perspective view of a motor vehicle, showing a windshield molding.

As shown in FIG. 6, a motor vehicle has a windshield 1, the peripheral edge of which is fastened to a body panel via a windshield molding 2 (hereinafter referred to as "molding 2") and a non-illustrated fastener. The molding 2 comprises a pair of extruded side molding parts 6, and an extruded upper molding part 4 integral with and extending between the side molding parts 6. The upper molding part 4 is mounted between the upper edge of the windshield 1 and a roof panel 3 of the vehicle body, and a pair of side molding parts 6 are mounted between pillar panels 5 and side edges of the windshield 1. These molding parts 6, 4 are extruded as one unit.

The fastener comprises a pair of extruded side fastener parts and an extruded upper fastener part integral with and extending between the side fastener parts similarly to the molding 2.

FIGS. 1 to 5 show a fastener 10 according to a first embodiment of this invention.

Figure 1:
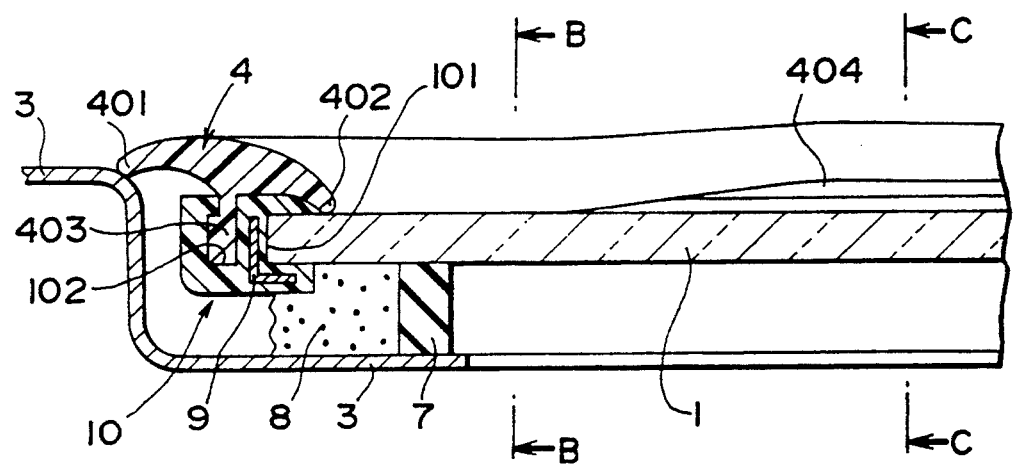
FIG. 1 is a side cross-sectional view of a fastener according to a first embodiment of this invention, taken along line A—A of FIG. 6.

As shown in FIG. 1, a peripheral edge of the roof panel 3 is folded inwardly to serve as a flange extending toward the windshield 1. The upper edge of the windshield 1 is positioned so as to overlap on the flange of the roof panel 3. A rubber dam 7 is positioned in the space where the roof panel 3 and the windshield 1 overlap. All of the roof panel 3, the windshield 1, and the rubber dam 7 are fastened by an adhesive 8.

Each of the upper and side molding parts 4, 6 comprises an exterior wing adapted to cover a space, on the exterior side of the vehicle, between the window-opening periphery of the vehicle body panel 3 (5) and each of side and upper edges of the windshield 1. The exterior wing includes an inward wing portion 402 (602) for covering the periphery of the windshield 1, an outward wing portion 401 (601) for covering the periphery of the vehicle body panel 3 (5), and a leg portion 403 (603). The molding parts 4, 6 are attached to the body panel 3, (5) via the fastener 10 which is fastened to the edge of the windshield 1.

The fastener 10 has a pair of longitudinally extending grooves or hollow portions 101, 102. Specifically, one groove 101 is square-shaped to receive the peripheral edge of the windshield 1, having upper and lower walls. The other groove 102 is key-shaped to receive the leg portion 403 (603) of the molding 2. The leg portion 403 (603) is shaped substantially identical to the groove 102 so as to be tightly received therein.

The inward wing portion 402 of the upper molding part 4 tightly covers not only the upper wall of the groove 101 of the fastener 10 but also the upper edge of the windshield 1. An L-shaped core metal member 9 is inserted in the fastener 10 to enclose part of the groove 101.

The position of the groove 102 is determined with reference to the groove 101. Specifically, the groove 102 is perpendicular to the groove 101. When it is received in the groove 102, the leg portion 403 of the molding 2 is parallel with the upper edge of the windshield 1. Under this condition, the inward wing portion 402 of the upper molding part 4 tightly covers the upper peripheral portion of the windshield 1.

Figure 2:
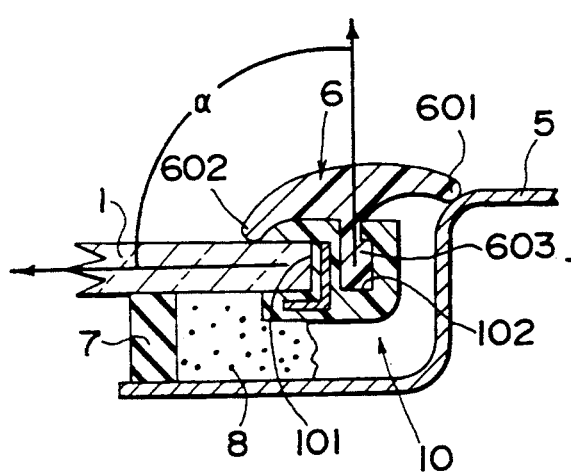
FIGS. 2 and 3 are side cross-sectional views of the fastener of FIG. 1, taken along lines B—B and C—C of FIG. 1.
Figure 3:
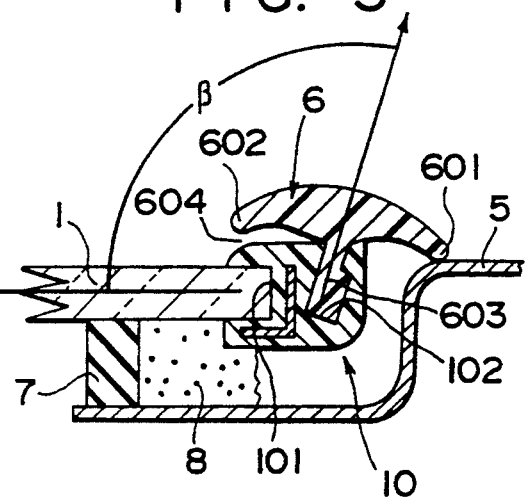

The position or posture of the groove 102 is successively varied with reference to the groove 101 such that in FIG. 3, groove 102 is now tilted away from groove 101. To receive the side molding part 6 of the molding 2, the groove 102 changes its position as shown in FIG. 3 from the posture shown in FIG. 2. Specifically, as shown in FIGS. 4 and 5, the cross-sectional shape of the fastener 1 is the same at the upper molding part, corner molding parts and the upper portion of the side molding parts. However, the groove 102 is tilted so that the side molding parts 6, associated with the lower portions of the windshield 1, are also tilted in the fastener 10 as shown in FIG. 3. Therefore, each of the side molding parts 6 is tilted toward each pillar panel 5, so that the inward wing portion 402 of the side molding part 6 is kept from contacting the side peripheral surfaces of the windshield 1. Thus, the outward wing portion 401 of the side molding part 6 is pressed to the pillar panel 5, and the inward wing portion 402 is kept away, so as to form a space, from the upper wall of the groove 101 and the peripheral surface of the windshield 1.

As can be appreciated from a review of FIGS. 2 and 3, groove or hollow portion 101 opens in the direction of the arrow while, correspondingly, groove or hollow portion 102 opens in its direction of openings shown by the arrow. The direction of openings of these two hollow portions forms an angle $\alpha$ which is variable from an angle of substantially 90°, as shown in FIG. 2, to an angle substantially greater than 90° as shown in FIG. 3. As can also be appreciated from the comparison of FIGS. 2 and 3, in FIG. 3 the opening of the second hollow portion has shifted in a direction away from the first hollow portion when the angle $\beta$ is varied from substantially 90° to instead be substantially greater than 90°.

This space is substantially V-shaped, serving as a water drain channel 604. The water drain channels are defined on the inward wing portion 402 along opposite side peripheral surfaces of the windshield 1 to guide liquid such as rain water in a predetermined direction, thereby keeping the liquid from being dispersed on the windshield.

The pair of the side fastener portions and the upper fastener portions are integrally extruded as one unit, thereby causing no difference in height of the fastener between the upper fastener portion and the side fastener portions.

In the foregoing embodiment, the groove 102 is positioned with reference to the groove 101. The position of the groove 102 can be determined with reference to an outer side wall of the fastener 10, which side wall is positioned near the body panel.

Figure 7:
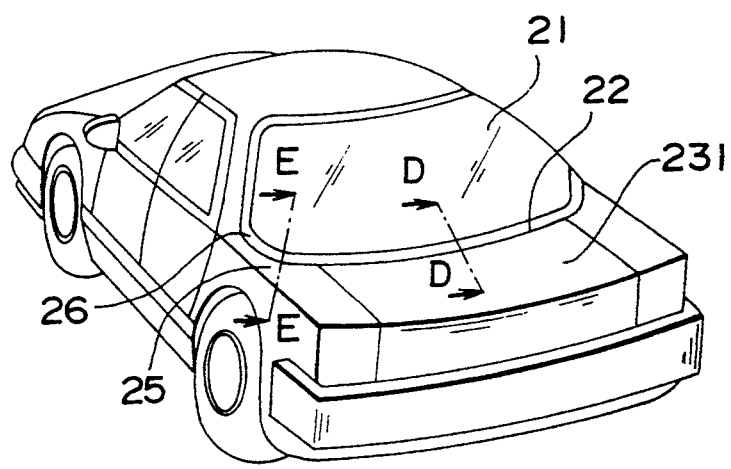
FIG. 7 is a perspective of the motor vehicle, showing a rear window molding.
Figure 8:
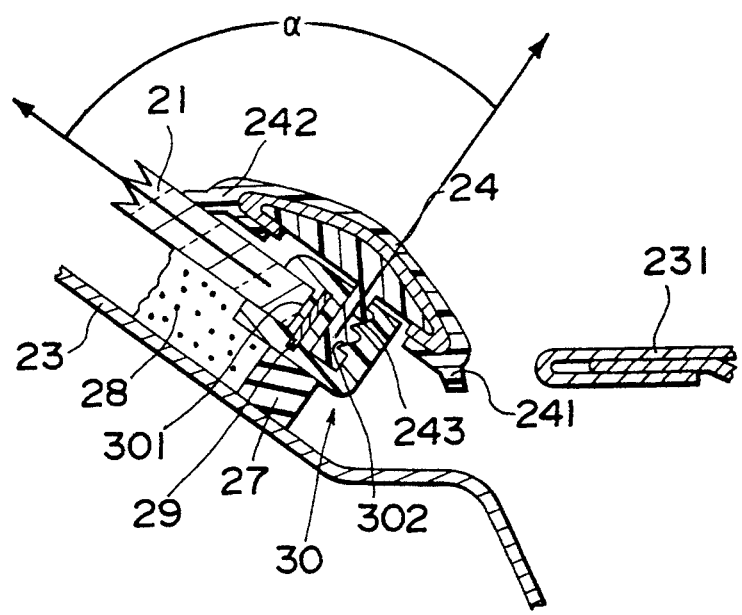
FIGS. 8 and 9 are side cross-sectional views of the rear window molding, taken along lines D—D and E—E of FIG. 7.
Figure 9:
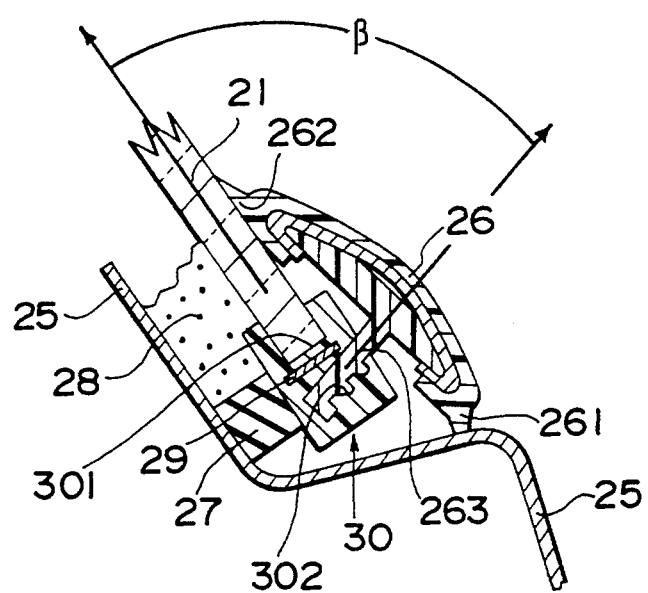

FIG. 7 shows a molding 22 which is attached between a rear window and the body panel of the motor vehicle. FIGS. 8 and 9 show the manner in which a fastener according to a second embodiment is used to mount the molding 22. The molding 22 comprises an extruded lower central molding part 24, an extruded upper molding part and a pair of extruded side molding parts 26, all of which are extruded as one unit. A fastener for mounting the molding 22 also comprises a lower central part, a pair of side parts and an upper part.

As shown in FIG. 8, a lower edge of the rear window 21 overlaps on a rear panel 23 of the motor vehicle. A rubber dam 27 is positioned where both the rear window 21 and the rear panel 23 overlap. The rear window 21, rear panel 23, rubber dam 27 are fastened by an adhesive 28.

The lower edge of the rear window 21 is covered by an exterior wing 24' of the lower central molding part 24. The lower central molding part 24 is attached to a lower edge of the rear window 21 via a fastener 30. An outward wing portion 241 of the lower central molding part 24 confronts a trunk panel 231 with a predetermined space, and an inward wing portion 242 of the lower central molding part 24 contacts the peripheral surface of the rear window 21.

The fastener 30 has a pair of long grooves 301, 302. The groove 301 is rectangular in its cross-sectional shape. The groove 302 has a straight wall and a corrugated wall. The groove 301 receives and fastens the lower edge of the rear window 21, and the groove 302 receives a leg portion 243 of the lower central molding part 24. The leg portion 243 is shaped substantially identical to the groove 302, thereby assuring tight contact with the groove 302.

Under this condition, the upper wall of the groove 301 and upper peripheral portion of the rear window 21 are covered by the inward wing portion 242 of the lower central molding part 24. A core metal member 29 is inserted along the bottom of the groove 301.

The position of the groove 302 is determined with reference to the groove 301. Specifically, both grooves 301, 302 are perpendicular to each other. As shown in FIG. 8, the inward wing portion 242 of the lower central molding part 24 covers the lower peripheral edge of the rear window 21.

The position of the groove 302 is successively changed with respect to the groove 301 in the lengthwise direction of the fastener 30. The position of the groove 302 shown in FIG. 9 is changed (i.e., tilted towards groove 301) as compared with the position shown in FIG. 8. The lower side molding part 26 is slantingly attached to the fastener 30 and the rear window 21.

The groove 302 is tilted toward the groove 301 to receive the lower side molding part 26 in a tilted manner. Under this condition, the leg portion 243 of the lower side molding part 26 is tilted in the groove 302 so as to come into tight contact with the side peripheral surface of the rear window 21. Specifically, the inward wing portion 262 of the lower side molding part 26 is pressed to the rear window 21, and the outward wing portion 261 of the molding part 26 is contacted with the outside panel 25. FIGS. 8 and 9 show the respective directions of opening of each of the grooves or hollow portions 301, 302 and the fact that the angle between these directions of openings varies from being 90° in FIG. 8 to being substantially less than 90° as shown in FIG. 9. More particularly, angle $\alpha$ is substantially 90° in FIG. 8 while angle B is substantially less than 90° in FIG. 9.

In the foregoing embodiment, the fastener 30 is successively extruded as a strip having a varying cross-sectional shape. There will no apparent difference in height between the lower central portions and lower side portions thereof as with conventional fasteners.

Although the position of the groove 302 is determined with respect to the groove 301, the groove 302 may be also positioned with respect to an outer side wall of the fastener, which side wall is positioned near the body panel.

Figure 10:
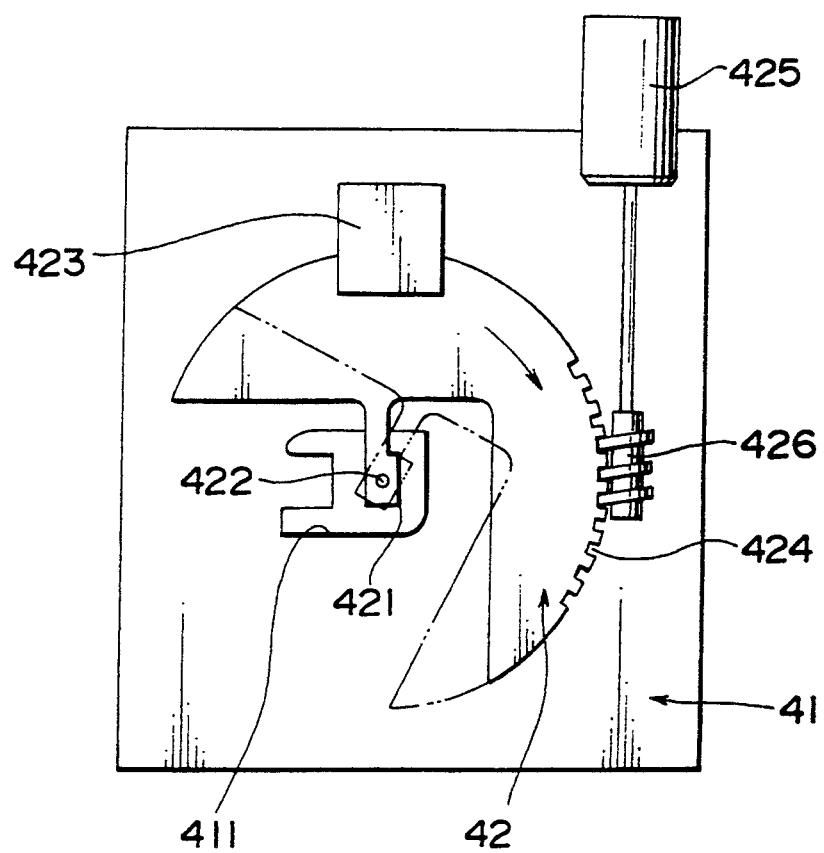
FIG. 10 is a front view showing a molding device for producing the fastener shown in FIGS. 1 to 5.

FIG. 10 shows a molding device for producing the fastener 10 according to the first embodiment of this invention.

The molding device comprises first and second dies 41, 42 which are juxtaposed in the direction in which a fastener is to be extruded. The first die 41 is stationary while the second die 42 is movable to and from the first die 41. The first die 41 has an opening 411 which substantially corresponds to the cross-sectional shape of the fastener 10 except for the groove 102. The second die 42 has a projection 421 for forming the groove 102 on the fastener 10.

The second die 42 is part of a disc-shaped member whose center is cut in the shape of the groove 102 of the fastener 10, serving as the projection 421. A support pin 422 is mounted in the center of the projection 421 to move the second die 42 angularly. The second die 42 is moved by a guide 423.

The peripheral edge of the second die 42 is partially toothed. A pinion 426 is engaged with the toothed portion 424 of the second die 42.

In operation, when a motor 425 is set in motion, an angle of the projection 421 is set as predetermined, thereby successively extruding the upper and side portions of the fastener 10 having the grooves in the predetermined cross-sectional shapes.

Figure 11:
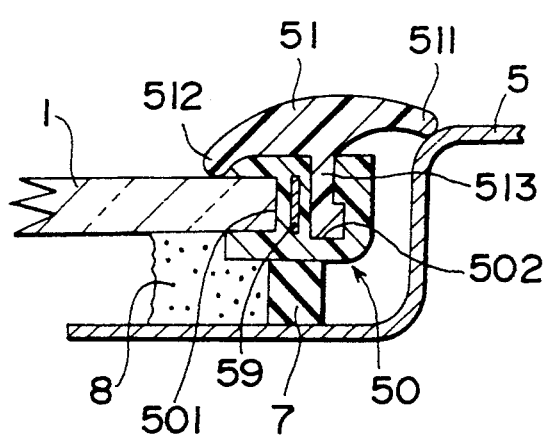
FIGS. 11 and 12 are views similar to FIGS. 2 and 3, showing a fastener according to a second embodiment of this invention.
Figure 12:
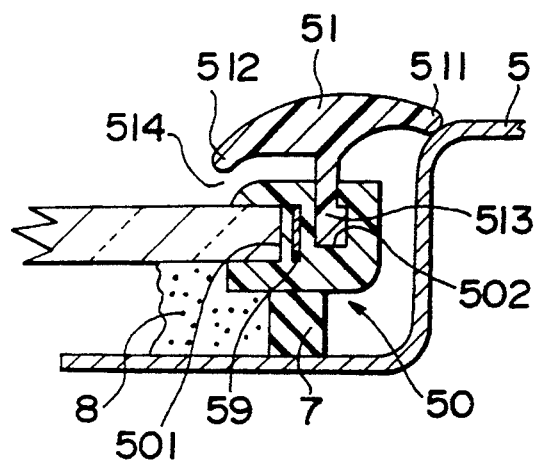

FIGS. 11 and 12 show a fastener 50 according to a further embodiment of this invention. Specifically these drawing figures show a manner in which the fastener is attached to an upper side edge and the lower side edge of the windshield 1, respectively.

As shown in FIG. 11, the side edge of the windshield 1 having the fastener 50 thereon overlaps on the pillar panel 5 of the motor vehicle. The rubber dam 7 is placed where the windshield 1 and the pillar panel 5 overlap, so that these members 1, 5, 7 are fastened by an adhesive 8.

A molding 51 includes an exterior wing for covering a space between the windshield 1 and the pillar panel 5. The exterior wing has an outward wing portion 511 and an inward wing portion 512. When attached to the fastener 50, the outward wing portion 11 of the molding 51 comes into contact with the peripheral surface of the pillar panel 5, and the inward wing portion 512 comes into contact with the side edge of the windshield 1 over the upper wall of the groove 501.

The fastener 50 has a pair of grooves 501, 502 longitudinally oriented. The groove 501 is square and perpendicular transversely, and the groove 502 is key-shaped. The grooves 501, 502 are adapted to receive and fasten the side edge of the windshield 1, and a leg portion 513 of the molding 51, respectively. The cross-sectional shape of the leg portion 513 is substantially identical to the cross-sectional shape of the groove 502 so that the leg portion 513 can be tightly fitted in the groove 502.

A thin core metal member 59 is inserted in the fastener 50 along the bottom of the groove 501.

The positional relationship between the grooves 501, 502 are identical to the positional relationships described with reference to the foregoing embodiments. The position of the groove 502 is successively changed as shown in FIG. 12 when receiving the lower side molding part such that the depth of groove 502 is decreased in FIG. 12 as compared with FIG. 11.

Specifically, the position of the groove 502 is slightly shifted upwardly to receive the lower side molding part. Therefore, the leg portion 513 of the molding projects from the groove 502 so that the interior wing portion 512 of the molding 51 extends outwardly from the surface of the windshield 1 as well as from the upper wall of the groove 501 while the outward wing portion 511 remains contacted with the pillar panel 5. The pillar panel 5 is shaped so that the outward wing portion 512 is in contact therewith.

The space between the upper wall of the groove 501 of the fastener 50 and the inward wing portion 512 serves as a water drain channel 514 to guide liquids such as rain water in a predetermined direction.

According to this invention, the fastener 50 is successively extruded as a long strip having a varying cross-sectional shape. There will be no apparent difference of height between the upper and side parts of the fastener.

The position of the groove 502 may also be determined with reference to an outer side edge of the fastener 50, which side edge is positioned near the body panel.

Figure 13:
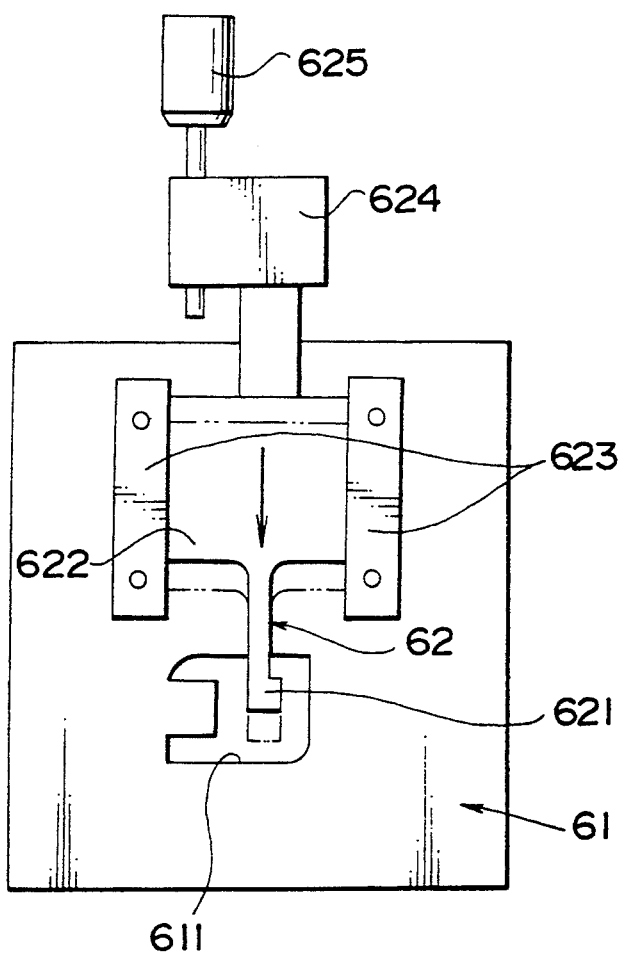
FIG. 13 is a front view of another molding device for producing the fastener according to the second embodiment.

A molding device for producing the fastener 50 is shown in FIG. 13.

The molding device comprises first and second dies 61, 62 which are Juxtaposed in the direction where material is to be extruded. The first die 61 is stationary, and the second die 62 is movable to and from the first die 61. The first die 61 has an opening 611 substantially corresponding to the cross-sectional shape of the fastener 50. The second die 62 has a projection 621 shaped according to the shape of the groove 502 of the fastener 50.

The projection 621 is coupled to a die body plate 622 of the second die 62. The die body plate 622 is movably supported by a pair of guides 623, being connected to an output shaft of a motor 625 via a converter 624.

When the motor 625 is set in motion, the projection 621 of the second die 62 is positioned as predetermined to change the position of the groove 502 of the fastener 50, thereby producing the fastener 50 in a strip shape.

What is claimed is:

1. A strip-shaped fastener for coupling a fastener member to a windshield fitting in a window opening of a body panel of a motor vehicle, which comprises:
   a first long hollow portion which opens in a first direction towards the window opening for receiving edges of said windshield; and
   a second long hollow portion for receiving a leg portion of the fastener member wherein said second long hollow portion and the received leg portion extend in a second direction along a respective depth and length dimension thereof which forms an angle with said first direction so as to be variable from an angle of substantially 90° along portions of the windshield to an angle substantially greater than 90° along other portions of the windshield.

2. A strip-shaped fastener for coupling an article having a long side positioned within a window opening to a body panel of a motor vehicle which comprises:
   a first long hollow portion which opens in a first direction towards the window opening for receiving said article having a long side; and
   a second long hollow portion for receiving a leg portion of a fastener member, in a second direction, along a respective depth and length dimension thereof, which forms an angle with said first direction so as to be variable from an angle of substantially 90° along portions of the article to an angle substantially less than 90° along other portions of the article.

3. A strip-shaped fastener as claimed in claim 1, which comprises a metal member positioned between said first and second hollow portion.

4. A strip-shaped fastener as claimed in claim 3, wherein said metal member comprises an L-shaped metal member.

5. A strip-shaped fastener as claimed in claim 2, which comprises a metal member positioned between said first and second hollow portion.

6. A strip-shaped fastener as claimed in claim 1, wherein said second hollow portion has a posture, when viewed in cross section, which changes along a length dimension of said second hollow portion, such that an opening of said second hollow portion is shifted in a direction away from said first hollow portion when said angle is varied from substantially 90° to substantially greater than 90°.

7. A strip-shaped fastener as claimed in claim 2, wherein said second hollow portion has a posture, when viewed in cross section, which changes along a length dimension of said second hollow portion, such that an opening of said second hollow portion is shifted in a direction towards said first hollow portion when said angle is varied from substantially 90° to substantially less than 90°.

8. A strip-shaped fastener as claimed in claim 1, wherein said second hollow portion has, when viewed in cross section, along a length dimension.

9. A strip-shaped fastener as claimed in claim 2, wherein said second hollow portion has, when viewed in cross section, along a length dimension a varying depth.

* * * * *